United States Patent
Braatz et al.

(10) Patent No.: US 9,654,393 B2
(45) Date of Patent: May 16, 2017

(54) METHOD FOR TRANSMITTING INFORMATION AND DEVICE FOR CARRYING OUT THE METHOD

(75) Inventors: Uwe Braatz, Hannover (DE); Uwe Nolte, Barsinghausen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 136 days.

(21) Appl. No.: 14/408,871

(22) PCT Filed: Jun. 19, 2012

(86) PCT No.: PCT/EP2012/061653
§ 371 (c)(1),
(2), (4) Date: Oct. 23, 2015

(87) PCT Pub. No.: WO2013/189518
PCT Pub. Date: Dec. 27, 2013

(65) Prior Publication Data
US 2016/0072707 A1    Mar. 10, 2016

(51) Int. Cl.
*H04L 12/721* (2013.01)
*H04Q 9/00* (2006.01)

(52) U.S. Cl.
CPC .............. *H04L 45/72* (2013.01); *H04Q 9/00* (2013.01)

(58) Field of Classification Search
CPC ..................................................... H04L 45/72
USPC ........................................ 318/446, 480, 663
See application file for complete search history.

(56) References Cited

U.S. PATENT DOCUMENTS

| 4,976,552 A | | 12/1990 | Ishikawa et al. | |
|---|---|---|---|---|
| 5,065,078 A | * | 11/1991 | Nao ........................... | H02P 7/05 318/16 |
| 5,629,590 A | * | 5/1997 | Yamamoto ............. | G08C 17/02 318/16 |
| 2010/0201350 A1 | | 8/2010 | Egger et al. | |

FOREIGN PATENT DOCUMENTS

| CA | 2625257 A1 | 5/2007 |
|---|---|---|
| CN | 1150353 A | 5/1997 |
| DE | 10 2005 029 410 A1 | 12/2006 |
| DE | 10 2007 029 824 A1 | 1/2009 |
| DE | 10 2010 023 535 A1 | 12/2011 |
| SU | 1073871 A2 | 2/1984 |

OTHER PUBLICATIONS

International Search Report for PCT/EP2012/061653 mailed May 28, 2013.

* cited by examiner

*Primary Examiner* — David S Luo
(74) *Attorney, Agent, or Firm* — Henry M. Feiereisen LLC.

(57) ABSTRACT

An electric motor and a motor control unit exchange information using at least one transfer signal, the information including motion state information of the electric motor and additional information transmitted via a transmission channel, where the motion state information is in the form of at least one base signal and the additional information is transmitted with the aid of the base signal.

13 Claims, 3 Drawing Sheets

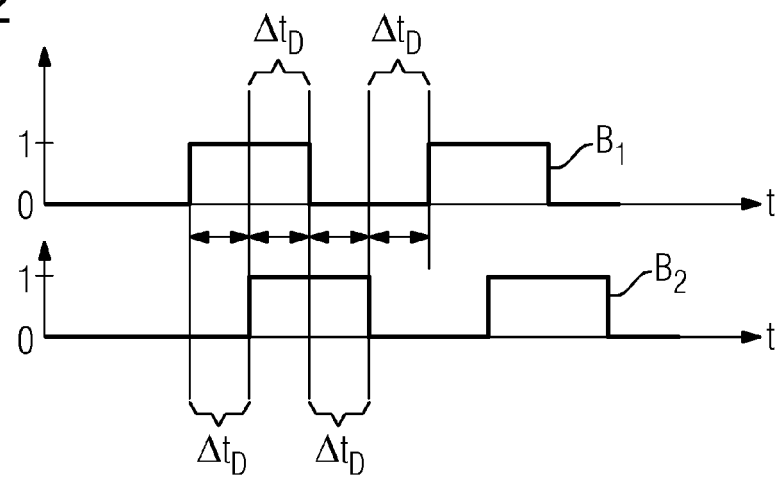
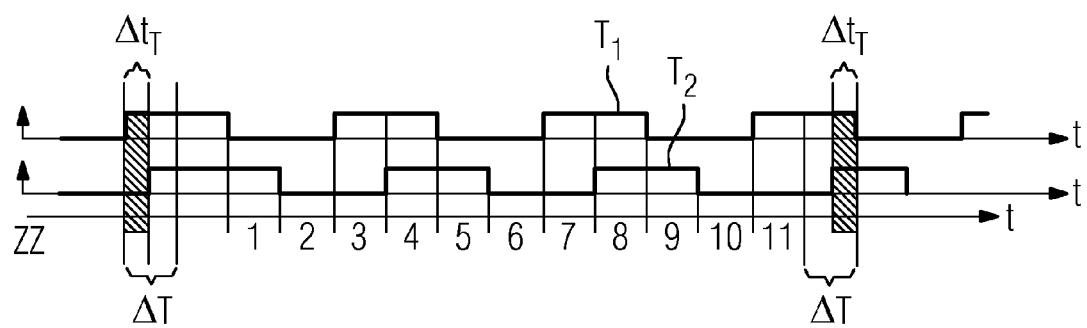

METHOD FOR TRANSMITTING INFORMATION AND DEVICE FOR CARRYING OUT THE METHOD

CROSS REFERENCE TO RELATED APPLICATIONS

This application is the U.S. national stage of International Application No. PCT/EP2012/061653, filed Jun. 19, 2012 and claims the benefit thereof and is incorporated by reference herein in their entirety.

BACKGROUND

Described below is a method for transmitting information between an electric motor and a motor control unit by at least one transfer signal, and to a device for carrying out such a method.

In many cases it is desirable or even necessary to transmit information from a motor, in particular an electric motor, or from its immediate surroundings, to a control unit or a controller. In the case of electric motors it is for example customary to detect the rotated position, speed of rotation and the direction of rotation of the rotor relative to the stator by way of sensors and to transmit the information obtained in this way to a controller with which the electric motor is controlled inter alia on the basis of this information.

The respective device for transmitting the information is typically designed for a specific amount of information per unit of time, so that a separate, i.e. additional, interface must be retrofitted between the motor and controller in order to transmit additional information which accrues by way of example in the case of a subsequently installed sensor.

Described below is an improved method for transmitting information and a device for carrying out a corresponding method. According to one basic idea additional information in particular is to be transmitted, with this information, which exists effectively by way of modulation, being transmitted without the existing information being substantially changed

SUMMARY

The method is used for transmitting information between an electric motor, or its immediate surroundings, and a motor control unit, wherein the transmission is performed with the aid of at least one transfer signal. Motion state information of the electric motor on the one hand and additional information on the other hand is transmitted as information via at least one transfer channel, wherein the motion state information is in the form of at least one base signal and wherein the additional information is transmitted with the aid of the base signal.

This method is conceived in particular also for application scenarios in which there is an interface between the electric motor and the motor control unit for transmitting motion state information and in which the amount of information to be transmitted per unit of time is additionally or subsequently increased by additional information. The transmission of additional information is then achieved by using the existing interface. For this purpose the additional information may be modulated to a base signal, which carries the motor state information, and then transmitted with the aid of a transfer signal. The additional information may be modulated to the base signal within the protocol-specific time tolerances, so that the information content of the base signal remains unchanged in the transfer signal.

If, by way of example, a device with an electric motor, a controller and what is known as a quadrature encoder interface is provided in which movements of the rotor of the electric motor towards the stator are detected using sensors by an incremental encoder, and in which this motion state information is transmitted to the controller via the quadrature encoder interface, then according to the method presented here this existing quadrature encoder interface is also used to transmit additional information, which is generated by way of example as a result of a temperature sensor additionally or subsequently implemented in the device and installed in the vicinity of the electric motor, to the controller. Fitting of a cable for example as a separate signal line between the temperature sensor and the controller is therefore omitted.

Additional information is not just taken to mean information or data which is generated by sensors or similar functional units, such as temperature sensors, operating hours counters, counters for the total number of rotor revolutions or even external sensors, but also information which is stored in particular as unchangeable parameters in an information memory. Therefore, it is for example known to provide assemblies or apparatuses with what is known as an electronic name plate which enables inter alia easier identification. An electronic name plate of this kind allows mutual recognition of the assemblies or apparatuses in particular if a plurality of such assemblies or apparatuses is combined with each other to form a system and these assemblies or apparatuses communicate with each other in the system. Based on the previous example the electric motor and the controller would therefore each be provided with an electronic name plate, so that by way of example in the case of a replacement of the controller due to a defect, the controller recognizes the electric motor by way of its electronic name plate and subsequently controls the electric motor as provided by adjusting parameters in the controller. There is also no imperative need to permanently transmit the additional information since this can for example also accrue temporarily, i.e. in certain intervals.

A variant of the method wherein the additional information is transmitted in the form of data packets is advantageous in particular if the additional information does not have to be permanently transmitted. A variant of the method may be used for identifying the start and end of each data packet, one trigger signal respectively is transmitted with the transfer signal. Identification of the start and end of a data packet during transmission of data is basically known and is primarily used if no shared reference clock is used for communication between two assemblies or two apparatuses.

A variant of the method also may be used for generating the transfer signal, trigger signals are inserted into the base signal and wherein the transfer signal in the periods between the trigger signals corresponds to the unchanged base signal. This means that most of the time the base signal itself is used as the transfer signal and that the base signal is manipulated into the transfer signal during the transformation only in specific intervals in order to generate a trigger signal in the transfer signal. In principle the given course over time of the base signal and the information provided thereby is utilized to transmit the additional information, with the signal receiver, i.e. the motor control unit, being informed about the period of the base signal in which the additional information to be transmitted can be found. This can ensure for example that an evaluation unit, which is adapted to evaluate the base signal, can also be fed with the transfer signal for this evaluation. Previous extraction of the base signal from the transfer signal is therefore unnecessary and the evaluation unit does not have to be adapted to read the motion state information, which is contained in the base signal, from the transfer signal either. The transfer signal is then fed simultaneously by way of example into a second evaluation unit which reads the additional information from the transfer signal.

A variant of the method is also advantageous wherein one, and in particular exactly one, numerical value is transmitted with each data packet, and this is given by the number of events in the course over time of the transfer signal between two trigger signals, and wherein only values from a strictly specified value set are used as the numerical values. In this way the data volume inter alia of each data packet is determined, with a nibble (16 possible values or states) being provided as the data volume. This variant of the method is also suitable by way of example for a device having an electric motor in which the rotated position of the rotor is detected by a digital absolute position encoder, having a controller and an interface between the electric motor and the controller in such a way that the motion state information determined by the digital absolute position encoder is transmitted with the aid of data packets between which one interval respectively is provided. In such a case a trigger signal by way of example is then generated in that a simple square wave pulse is transmitted during such an interval, so that the transfer signal between two data packets has a square wave pulse, and an interval between two data packets is classified as an event in the course over time of the transfer signal. This means that the number of events in the course over time of the transfer signal in this case matches the number of intervals between two trigger signals.

A variant of the method is also expedient wherein at least two transfer signals are used for transmitting the information, wherein each transfer signal is transmitted via a separate transfer channel, i.e. for example via an electric cable, and wherein the motion state information is present in the form of two base signals. This means that the method described here can be used in as many application scenarios as possible.

In particular a phase relationship is given between the two base signals, wherein according to a variant of the method one of the two base signals is used unchanged as one of the transfer signals and wherein the other base signal is converted into the other transfer signal by manipulation of the phase relationship. The additional information is then incorporated in the transfer signals by manipulation of the phase relationship.

According to a further variant of the method a specific phase relationship between the transfer signals acts as the trigger signal. In the simplest case two transfer signals for example are used, between which there is a time-dependent phase relationship. A base value and a trigger value are then provided as possible values for this phase relationship, with most of the time being above the base value and with a time-limited change in the phase relationship being forced onto the trigger value in order to generate a trigger signal.

It is also advantageous to perform a time quantization with discrete values, so that only these values are provided for the phase relationship as well and so that these values can be used for encoding the additional information. Based on the previous example it is no longer two possible values that can be set for the time-dependent phase relationship therefore; instead a larger number of values is provided. In particular a modulation of the phase relationship is then performed, so that the additional information is incorporated in the transfer signals with the aid of this phase modulation.

A variant of the method is also expedient in which the motion state information of the motor is generated by an incremental encoder and wherein a quadrature encoder interface with two transmission channels is used for transmitting the information between the electric motor, or its immediate surroundings, and the motor control unit. This variant of the method constitutes an adjustment to a particularly typical application scenario. Binary signals may be used in each case as the base signals and transfer signals, and a respective event also may be provided by a change in signal level. If therefore, for example, a numerical value is transmitted which corresponds to specific additional information according to a provided encoding, then this numerical value may be given by the number of signal edges of a binary transfer signal. A plurality of possible variants is provided in particular in the case of two transfer signals, wherein according to one variant only the rising edges of a transfer signal are counted, wherein according to a further variant only the falling edges of a transfer signal are counted, wherein according to a further variant the rising edges of both transfer signals are counted, etc. In a variant all edges, i.e. the rising and falling edges of the two transfer signals, are counted since the data transfer rate for the additional information is greatest here.

The time-dependent phase relationship between the two transfer signals is in this case given by the interval between two successive changes in signal level in the two transfer signals. This interval depends on the speed of rotation of the rotor of the electric motor. Therefore a time quantization for example is specified in such a way that only discrete speeds of rotation are specified for the rotor by appropriate control of the electric motor by way of the motor control unit. However, a time quantization may be that only discrete speeds of rotation are transmitted with the transfer signals by way of an appropriate change, similar to as in an analog-to-digital conversion, in the base signals, by way of example in a modulator. Consequently only discrete intervals between two successive signal level changes are allowed in the case of a typical phase relation of 90° between the two transfer signals. The value range between two values specified in this way for the phase relationship is then available in order to incorporate the additional information in the transfer signals by manipulation of the phase relationship, so that the transfer signals differ in particular from the base signals in particular by way of a changed phase relationship.

A variant of the method is also advantageous wherein as required as a function of the operating state of the electric motor, at least one of the transfer signals is generated by superposition of one of the base signals and an additional signal which carries the additional information. If, therefore binary signals for example are generated in an electric motor by an incremental encoder and if the number of edges of these base signals is provided as the number of events in the course over time of the transfer signal between two trigger signals, then the data transfer rate for the additional information is in direct correlation with the speed of rotation of the rotor of the electric motor, i.e. the motor speed. Depending on the application, the data transfer rate for transmitting the additional information can therefore be too low at low motor speeds, so that in these cases the number of events, i.e. for example the edge changes, in the transfer signal is additionally increased with respect to the base signal to ensure an adequate data transfer rate.

In a variant of the method the additional signal is generated as a sequence of pulses, wherein the motor control unit has a counter with which the transfer signals are evaluated and which outputs the motion state information as a time-dependent counter value, and wherein the additional signal is generated in such a way that the course over time changes but the counter value does not change due to a pulse. This means that for example the counter evaluates both edges of a square wave pulse and that the two changes in the counter value given thereby are cancelled out.

In a variant of the method the motor control unit has a base counter and an additional counter, with the base counter counting each edge change and with the additional counter counting and outputting the edge change between two trigger signals respectively and with the additional counter being reset to an initial value again with each trigger signal. The base counter then outputs the motion state information as a time-dependent base counter value and the additional counter outputs the additional information as a sequence of additional counter values. The transfer signals are fed into the two counters simultaneously in this case.

BRIEF DESCRIPTION OF THE DRAWINGS

These and other aspects and advantages will become more apparent and more readily appreciated from the following description of the exemplary embodiments with reference to the accompanying drawings of which:

FIG. 2 is a graph a section of the course over time of two base signals with a constant speed of rotation of the electric motor, FIG. 3 is a second graph a section of the course over time of two transfer signals with a constant speed of rotation of the electric motor.

DETAILED DESCRIPTION OF THE PREFERRED EMBODIMENT

Figure 1:
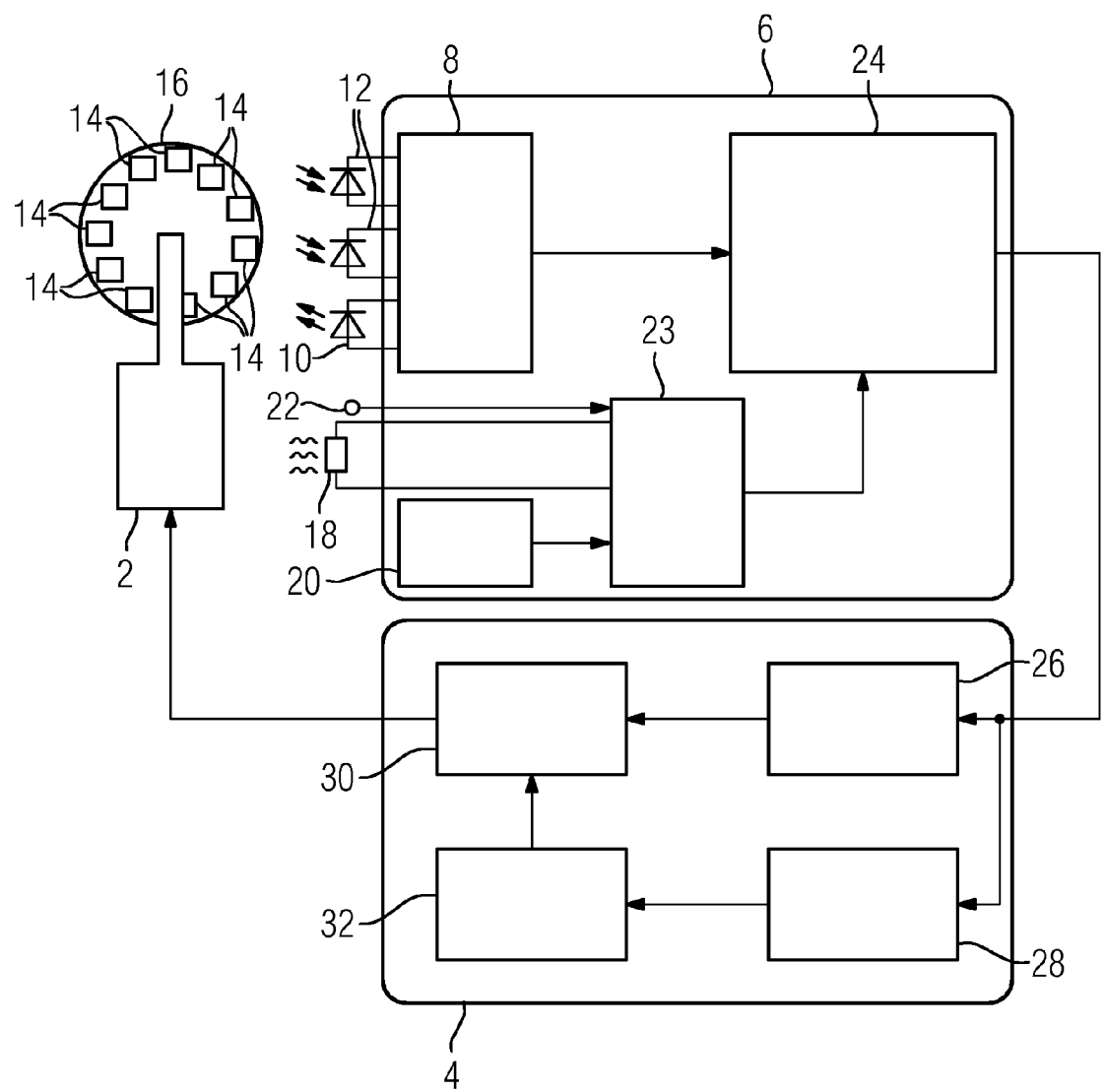
FIG. 1 is a block diagram of a drive unit with an electric motor and a motor control unit.

Reference will now be made in detail to the preferred embodiments, examples of which are illustrated in the accompanying drawings, wherein parts are in each case provided with the same reference numerals in all figures.

In the exemplary embodiment described below an electric motor 2 acts by way of example as a drive unit of an elevator door (not shown). The electric motor 2 is controlled, as shown in FIG. 1, with the aid of a motor control unit 4 and is also monitored by a sensor unit 6, wherein the sensor unit 6 transmits motion state information of the electric motor 2 and additional information to the motor control unit 4.

To generate the motion state information the sensor unit 6 includes an incremental encoder 8 which in the exemplary embodiment operates in accordance with the principle known per se of photoelectric scanning. For this purpose the incremental encoder 8 has a light-emitting diode 10 and two photodiodes 12 opposing the light-emitting diode 10. Projecting circumferentially into the gap between the light-emitting diode 10 and the slightly mutually offset photodiodes 12 is a coding disk 14, provided with slits 14 and located on a drive axis, so that the photodiodes 12 are illuminated with light from the light-emitting diode 10 after a delay if a slit 14 in the coding disk 16 is moved past the photodiodes 12. If the drive axis then rotates together with the coding disk 16 the incremental encoder 8 generates two binary square wave signals as base signals B1 and B2 which, as indicated in FIG. 2, are phase-shifted due to the spatial offset of the two photodiodes 12, by way of example by 90°. Each of the two base signals B1, B2 is generated by a photodiode 12.

Apart from the motion state information there is yet further information available in the sensor unit 6 as additional information, and this is generated for example with the aid of additional sensors, such as a temperature sensor 18. Additional information is also present in the sensor unit 6, and this is stored in an information memory 20. If required, further additional information is also supplied to the sensor unit 6 from outside via a data input 22. It is therefore possible for example to subsequently add further sensors as external sensors whose measured signals are then supplied via the data input 22 to the sensor unit 6. All additional information is collated in a coding unit 23 and prepared for further processing, optionally recoded and compiled to form data packets.

According to the basic idea of the method presented here the additional information available in the sensor unit 6 should not be transmitted via a separate transmission channel to the motor control unit 4 but with the aid of the base signals B1, B2, which transport the motion state information of the electric motor 2. For this purpose, integrated in the sensor unit 6 is a modulator 24 into which the base signals B1 and B2 and the prepared additional information are fed. Generated in the modulator 24 based on the base signals B1 and B2 are two transfer signals T1 and T2 which contain the motion state information and the additional information. The two transfer signals T1, T2 are then forwarded from the sensor unit 6 via a quadrature encoder interface to the motor control unit 4 and in the motor control unit 4 are simultaneously fed into a base evaluation unit 26 and a demodulator 28.

The transfer signals T1, T2 are evaluated in the base unit 26 with respect to the motion state information, with time-dependent values for the rotated position, speed of rotation and direction of rotation of the coding disk 16 being output and forwarded to a control logic 30 of the motor control unit 4. The data packets are extracted from the transfer signals T1, T2 by the demodulator 28 and forwarded to a decoding unit 32. The additional information is prepared again in the decoding unit 32, optionally decoded or recoded and then supplied to the control logic 30.

The control logic 30 generates a control signal on the basis of the motion state information and/or the additional information, and this signal is transferred to the electric motor 2 and controls it.

The two base signals B1 and B2 output by the incremental encoder 8 are binary signals or square wave signals with two defined states or signal levels which are designated state 0, 0 or "low" for short, and state 1, 1 or "high" for short. The duration of a state or the interval between two changes in signal level and therewith the frequency of the change in signal level in each of the base signals B1 and B2 depends firstly on the design and distribution of the slits 14 on the coding disk 16 and secondly on the speed of rotation of the coding disk 16 and therewith on the motor speed. With a constant speed of rotation of the coding disk 16 the two base signals B1 and B2 have an identical course over time, albeit phase-shifted by 90°, as is shown in a section in FIG. 2. In a manner known per se the two base signals B1 and B2 can be used jointly to determine the rotated position, speed of rotation and direction of rotation of the coding disk 16.

According to the method proposed here, however, the two base signals B1 and B2 should not simply be transmitted to the motor control unit 4 and be evaluated with the base evaluation unit 26 but should instead be converted in the modulator 24 into transfer signals T1 and T2. A time quantization is specified for this in such a way that by appropriate conversion of the base signals B1 and B2 in the modulator 24 only discrete speeds of rotation are transmitted with the transfer signals T1 and T2. The base signals B1 and B2 are subjected more or less to a speed of rotation quantization, similar to an analog-digital conversion. As a consequence, starting from a phase relation of 90° between the two base signals B1 and B2, only discrete speed of rotation-dependent intervals $\Delta t_D$ are allowed between a change in signal level in transfer signal T1 and a change in signal level in transfer signal T2. The value range between two discrete speed of rotation-dependent values is then available for the phase relationship in order to modulate the additional information by manipulation of the phase relationship in the modulator 24, so that the transfer signals T1 and T2 differ from the base signals B1 and B2 by way of a changed phase relationship as well.

According to a particularly simple variant only trigger signals are transmitted to the motor control unit 4 by manipulation of the phase relationship. For this purpose values from the sequence 40 µs, 60 µs, 80 µs, etc. are firstly specified for the intervals $\Delta t_D$ in the transfer signals T1 and T2 as speed of rotation-dependent values, fixed by the time quantization, for the phase relationship. A phase shift is then performed in the modulator 24 in order to transmit a trigger signal, so that values from the sequence 30 µs, 50 µs, 70 µs, etc. exist in the transfer signals T1 and T2 for the time difference $\Delta t_T$, and these are then recognized in the demodulator 28 as trigger signals.

The phase shift performed for a trigger signal is limited time-wise in that the duration of a state in one of the base signals B1, B2, which have been subjected to a time quantization, is extended and, furthermore, the state which follows or precedes it is shortened. FIG. 3 shows this situation. The two transfer signals T1 and T2 shown therein differ from the time-quantized base signals B1 and B2 only in that there is one trigger signal respectively in the periods $\Delta T$. The phase relationship in the periods $\Delta T$ is given by the interval $\Delta t_T$ between the changes in signal level, i.e. the edges of the square wave signals. This interval $\Delta t_T$ is detected in the demodulator 28 and recognized and classified as a trigger signal. The time delay of 10 µs, chosen here by way of example, in the two value sequences for the time differences $\Delta t_D$ and $\Delta t_T$ ensures that undesirable variations, which are typically present, in the phase relationship of the transfer signals T1 and T2 do not lead to an incorrect evaluation. When choosing a suitable minimum delay care should be taken firstly that it is greater than the undesirable variations, which are typically present, in the phase relationship of the transfer signals T1 and T2, and secondly the chosen delay must be long enough that it can still be detected by the demodulator 28 and the base evaluation unit 26 in the case of a maximum speed of rotation of the electric motor 2 and a given resolution in terms of time.

Alternatively, instead of a sequence of values, a single value, or rather a value range, for example from 5 µs to 30 µs, which is below the lowest value from the sequence of values for the intervals $\Delta t_D$ (matches the value in the case of the highest provided motor speed) and is above the resolution limit in terms of time, is provided for the time difference $\Delta t_T$ in the case of a trigger signal.

The two transfer signals T1 and T2 are then transmitted via the quadrature encoder interface, a two-core electric cable, to the motor control unit 4 and from there are fed simultaneously into the base evaluation unit 26 on the one hand and the demodulator 28 on the other hand. The evaluation of the transfer signals T1 and T2 by the base evaluation unit 26 is made in accordance with a principle known per se, with a base counter BZ determining a time-dependent counter value. The current counter value depicts the current rotated position of the coding disk 16, and the speed of rotation and the direction of rotation of the coding disk 16 can be determined from the change in the counter value over time. The counter value of the base counter BZ changes with each change in signal level in the transfer signals T1 and T2, with a change of +1 or −1 occurring depending on the manner of the change in signal level. The variants possible here are:

| Change in signal level | At signal level | Change in counter value BZ | Direction of rotation of electric motor |
|---|---|---|---|
| T1 from 0 to 1 | T2 at 1 | −1 | Counterclockwise |
| T2 from 0 to 1 | T1 at 0 | −1 | Counterclockwise |
| T1 from 1 to 0 | T2 at 0 | −1 | Counterclockwise |
| T2 from 1 to 0 | T1 at 1 | −1 | Counterclockwise |
| T1 from 0 to 1 | T2 at 0 | +1 | Clockwise |
| T2 from 0 to 1 | T1 at 1 | +1 | Clockwise |
| T1 from 1 to 0 | T2 at 1 | +1 | Clockwise |
| T2 from 1 to 0 | T1 at 0 | +1 | Clockwise |

The motion state information of the electric motor 2 represented by the course over time of the counter value of the base counter BZ is recoded in the base evaluation unit 26 for further processing in the control logic 30, and then forwarded to it.

A second evaluation of the transfer signals T1 and T2 is made simultaneously in the demodulator 28. An additional counter ZZ is initially read on each occurrence of a trigger signal, and is then reset to zero. As a result each change in signal level in the transfer signals T1 and T2 causes a change in the counter value by +1 until, finally, on the next trigger signal the counter value is read out again and then reset to zero. The read counter value, which is transmitted with each data packet to the motor control unit 4, matches the coded additional information which is contained in this data packet. This is a count value between 0 and 17, so that a data volume of one nibble is transmitted with each data packet. The count value is then transmitted to the decoding unit 32 in which the additional information is prepared by suitable recoding for output to the control logic 30.

As already mentioned, the frequency of the change in signal level depends on the speed of the electric motor 2, for which reason the data transfer rate for the additional information is also dependent on the motor speed. To ensure that the data transfer rate does not drop below a required minimum the modulator 24 changes from the basic operating mode into a second operating mode as soon as the interval between two successive changes in signal level exceeds a stored threshold, here 60 ms. In this second operating mode additional square wave pulses are generated in the modulator 24 and transmitted to the motor control unit 4, with the transfer signals T1 and T2 being generated by superposition of the base signals B1 and B2 with a sequence of these square wave pulses. Square wave pulses with a short duration $P_T$ of 10 µs (+/−3 µs) serve as trigger signals in this connection, and square wave pulses with a longer duration $P_z$ of more than 17 µs serve to influence the counter value of the additional counter ZZ.

Figure 4:
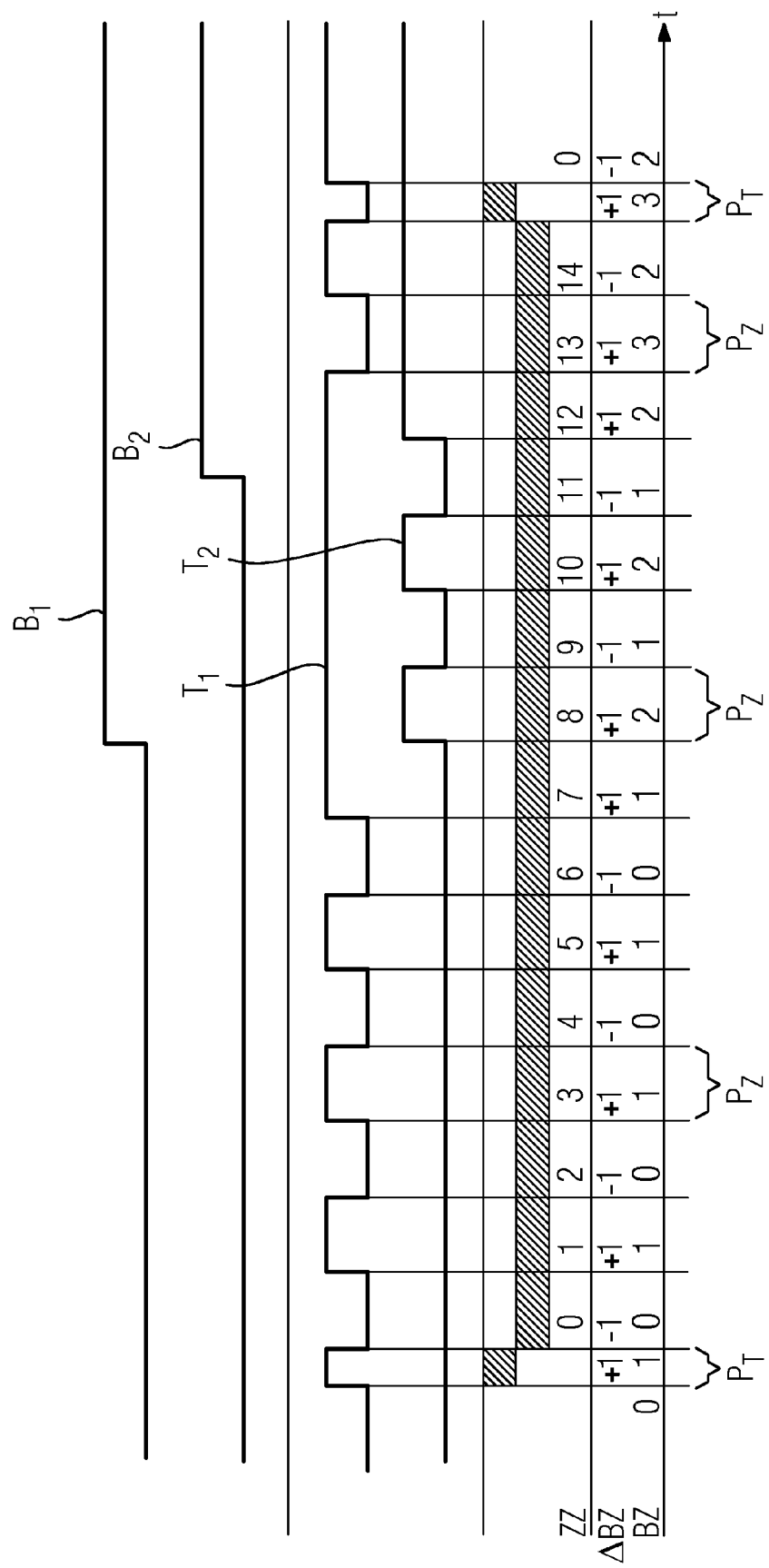
FIG. 4 is a third graph a section of the course of time of the two base signals, the two transfer signals and two counter values at a low speed of rotation of the electric motor.

In the base counter BZ on the other hand, the square wave pulses do not cause a change in the counter value since the two changes in signal level of each square wave pulse, as shown in FIG. 4, each cause a change $\Delta BZ$ of +1 and −1 in the base counter BZ. Alternatively square wave pulses are used in which the sequence of changes ΔBZ in the counter value is reversed, in which, in other words, the changes in signal level cause a change ΔBZ of −1 and +1.

| Square wave pulse at signal level | Change in counter value BZ | On the basis of two changes in signal level |
|---|---|---|
| T1 at 0 and T2 at 0 | +1 − 1 = 0 | T1 from 0 to 1 and T1 from 1 to 0 |
| T1 at 1 and T2 at 0 | +1 − 1 = 0 | T2 from 0 to 1 and T2 from 1 to 0 |
| T1 at 1 and T2 at 1 | +1 − 1 = 0 | T1 from 1 to 0 and T1 from 0 to 1 |
| T1 at 0 and T2 at 1 | +1 − 1 = 0 | T2 from 1 to 0 and T2 from 0 to 1 |
| T1 at 0 and T2 at 0 | −1 + 1 = 0 | T2 from 0 to 1 and T2 from 1 to 0 |
| T1 at 1 and T2 at 0 | −1 + 1 = 0 | T1 from 1 to 0 and T1 from 0 to 1 |
| T1 at 1 and T2 at 1 | −1 + 1 = 0 | T2 from 1 to 0 and T2 from 0 to 1 |
| T1 at 0 and T2 at 1 | −1 + 1 = 0 | T1 from 0 to 1 and T1 from 1 to 0 |

Care is taken in this connection that the interval between two changes in signal level in the transfer signals T1 and T2, i.e. one in T1 and one in T2, is at least 9 μs. When choosing a suitable minimum interval care should also firstly be taken that this is greater than the typically present undesirable variations in the phase relationship of the transfer signals T1 and T2, and secondly, the chosen delay must be long enough that it can still be detected with a given resolution in terms of time.

If the speed of the electric motor 2 increases beyond the specified threshold value again, or beyond a second threshold value, the modulator 24 changes back to the base operating mode again.

The invention is not limited to the exemplary embodiment described above and instead a person skilled in the art can derive other variants herefrom without departing from the subject matter of the invention. In particular all individual features described in connection with the exemplary embodiment may also be combined with each other in some other way without departing from the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for transmitting information between an electric motor and a motor control unit, comprising:
    transmitting motion state information of the electric motor and additional information via two transmission channels using at least two transfer signals, each transfer signal transmitted via a separate transfer channel, the motion state information transmitted as first and second base signals having a phase relationship therebetween and the additional information transmitted with aid from the base signals, the first base signal used unchanged as a first one of the transfer signals and the second base signal converted into a second one of the transfer signal by manipulation of the phase relationship.

2. The method as claimed in claim 1, wherein the additional information is transmitted in data packets.

3. The method as claimed in claim 2, wherein one trigger signal is transmitted in the transfer signal to identify start and end of each data packet.

4. The method as claimed in claim 3,
    further comprising generating the transfer signal by inserting trigger signals into the base signal, and
    wherein the transfer signal in periods between the trigger signals corresponds to the unchanged base signal.

5. The method as claimed in claim 3, further comprising transmitting with each data packet a numerical value selected from a specified value set and corresponding to a number of events over time of the transfer signal between two trigger signals.

6. The method as claimed in claim 3, wherein a specific phase relationship acts as the trigger signal.

7. The method as claimed in claim 1, further comprising performing time quantization with discrete values, so that only the discrete values are provided for the phase relationship as well and wherein the discrete values are used for encoding the additional information.

8. The method as claimed in claim 1,
    further comprising generating the motion state information of the electric motor by an incremental encoder, and
    wherein said transmitting of the motion state information and the additional information between the electric motor and the motor control unit is performed by a quadrature encoder interface via the two transmission channels.

9. The method as claimed in claim 1, wherein the base signals and transfer signals are binary signals.

10. The method as claimed in claim 1, wherein a respective event is given by a change in signal level.

11. The method as claimed in claim 1, wherein, as required as a function of an operating state, at least one of the transfer signals is generated by superposition of one of the base signals and an additional signal which carries the additional information.

12. The method as claimed in claim 11,
    wherein the motor control unit includes a counter with which the transfer signals are evaluated and which outputs the motion state information as a time-dependent counter value, and
    wherein the additional signal is generated as a sequence of pulses in such a way that the counter value does not change due to a pulse.

13. A device with a motor control unit for transmitting information between an electric motor and the motor control unit, comprising:
    a sensor unit with an incremental encoder generating motion state information of the electric motor and additional information provided for transmission via two transmission channels, the motion state information transmitted as first and second base signals, also used for transmitting the additional information, with a phase relationship therebetween, at least two transfer signals transmitting the information via a separate transfer channel, respectively, the first base signal used unchanged as a first one of the transfer signals and the second base signal converted into a second one of the transfer signal by manipulation of the phase relationship.

* * * * *